United States Patent

[11] 3,573,432

[72] Inventors David Murray
Phoenix, Ariz.;
Kenneth D. Hulse, Glendale, Calif.
[21] Appl. No. 629,570
[22] Filed Apr. 10, 1967
[45] Patented Apr. 6, 1971
[73] Assignee General Electric Company

[54] SYSTEM FOR READING CODED INFORMATION FROM PUNCHED CARDS WITH AUTOMATIC ERROR DETECTION AND CORRECTION
9 Claims, 7 Drawing Figs.

[52] U.S. Cl. .......... 235/61.7, 235/61.11, 328/120
[51] Int. Cl. .......... G06k 5/00
[50] Field of Search .......... 340/174.1 (A), 146.1 (Inquiry); 235/61.7, 61.11, 61.115; 328/120

[56] References Cited
UNITED STATES PATENTS

| | | | |
|---|---|---|---|
| 3,153,721 | 10/1964 | Kaminski et al. .......... | 235/61.11 |
| 2,817,072 | 12/1957 | Kun Lichien et al. .......... | 340/174.1(A) |
| 3,222,501 | 12/1965 | Wood .......... | 235/61.7 |

*Primary Examiner*—Thomas A. Robinson
*Attorneys*—George V. Eltgroth, Oscar B. Waddell, Frank L. Neuhauser, Edward W. Hughes, George R. Powers and Joseph B. Forman

ABSTRACT: A logic control system energized by signals derived from punched cards which detects and corrects errors resulting from misread or damaged cards.

INVENTORS.
DAVID MURRAY
KENNETH D. HULSE
BY
Warren F. B. Lindsley
ATTORNEY

Patented April 6, 1971 3,573,432

6 Sheets-Sheet 2

SYSTEM FOR READING CODED INFORMATION FROM PUNCHED CARDS WITH AUTOMATIC ERROR DETECTION AND CORRECTION

BACKGROUND OF THE INVENTION

This invention relates to systems for reading coded information and more particularly to means employing logic circuits for controlling signals developed from a reading of punched holes in an information-bearing medium.

1. Field of the Invention

In high-speed data-processing systems, information processed by the system is supplied from an external source. This external source may furnish information to the data-processing system from suitable information-bearing mediums such as punched cards. Such cards usually have holes selectively punched at any one of the intersections of a matrix of 80 vertical columns and 12 horizontal rows. These holes are usually rectangular in shape and may be closely spaced leaving between them a thin web of card material.

Card readers are used for reading information punched into the cards and for converting the presence or absence of a hole into an electrical signal representing a binary 1 or 0. Stacks of cards placed in a hopper of the card reader are rapidly moved one at a time from the hopper, past a sensing station where they are read, and then deposited in another stack. High-speed movement of the cards over each other as they move into and out of the stacks may damage or tear out the narrow webs of material extending between adjacent punched holes. Since the holes and webs of material are used in creating separate and distinct signals for each punched hole, their damage or destruction causes the card reader to malfunction. For example, if a web between two adjacent punched holes is torn, the card reader will erroneously produce only one signal for both punched holes. Further, if the card reader detects an error but is incapable of correcting it, the error has been unrecorded.

2. Description of the Prior Art

In order that information read from a card may be synchronously transferred to a data processor, some system must be provided for generating a timing pulse for each column position of the card scanned. One such system employs a sensor which starts the generation of timing pulses when the leading edge of the card reaches a given position in its travel through the card reader. Such a system insures that the first timing pulse occurs at the time the first column of the card is in position to be read. Other timing pulses follow the first pulse at regular intervals so that a perfectly aligned card would have a column in position to be read each time a timing pulse occurs. Each timing pulse causes an information signal existing during the timing pulse to be transferred to the data processor.

Card expansion or contraction due to moisture and slippage between the card and the card-moving mechanism may cause timing pulses to occur at times when holes in later columns of the card are not at the sensing station. Therefore, a need exists for logic circuitry which will periodically transfer signals representative of the information being read by the card reader even though coincidence does not occur between the reading of a hole and a timing pulse and which will detect and include an error or misread condition even though it cannot correct it.

SUMMARY OF THE INVENTION

In accordance with the invention claimed, a new and improved system is provided for accurately reading information from punched cards. These cards will be correctly read even though they have torn or damaged webs between the holes. If a punched hole is not read for one reason or another, the misread condition will be corrected, if possible, and if not correctable, it will be detected and identified as an error condition.

The logic circuitry disclosed extends the signals generated by the reading of punched holes in the cards beyond the time the holes are being sensed in order to provide sufficient time for simultaneity to occur between the signals generated representative of the information being read and the timing pulses. These functions are achieved by providing a novel combination of timing and signal storage means.

Accordingly, it is an object of this invention to provide an improved system for reading punched holes in an information-bearing medium.

Another object of this invention is to provide improved logic circuitry for reading punched cards in which misread data is corrected or detected where not correctable.

A further object of this invention is to provide a novel system for reading punched cards having damaged or torn webs between the holes.

A further object of this invention is to provide a novel system for extending the duration of a signal, representative of the information being read, beyond the time the punched hole representing the information exists at a sensing station.

Other objects and advantages of the present invention will be apparent from the following specification taken in connection with the accompanying drawings.

DESCRIPTION OF THE PREFERRED EMBODIMENT

The present invention relates to a system for reading coded information from punched cards and since it is believed to be unnecessary to describe the well-known details of these systems in order to completely describe the invention, block diagrams will be used where possible. However, even though known details will be illustrated, the basic description of the entire system will be presented to enable one skilled in the art to understand the environment in which the present invention is placed.

Figure 1:
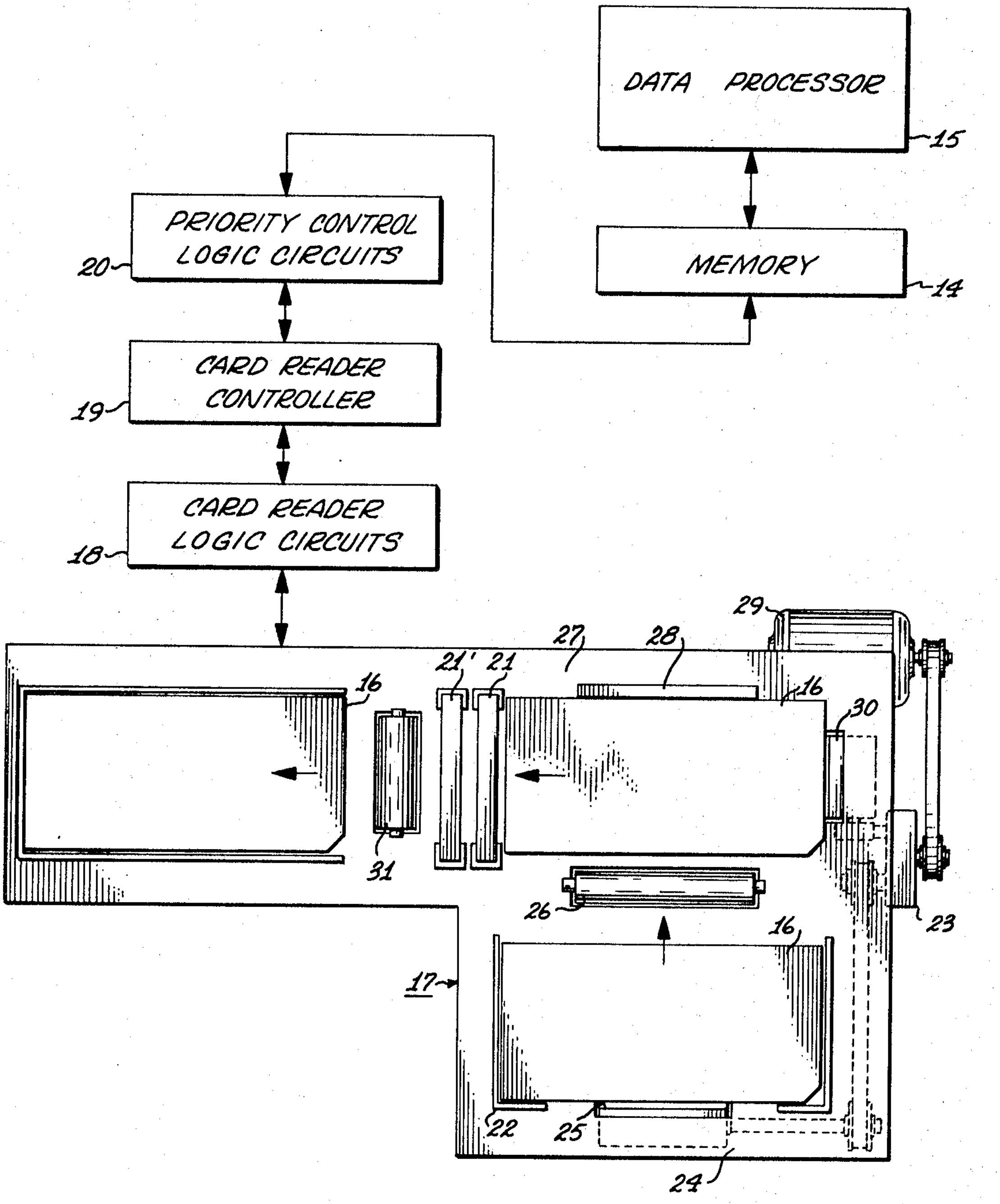
FIG. 1 is block diagram of an information processing system embodying the present invention.

Referring more particularly to the drawings by characters of reference, FIG. 1 discloses an information processing system wherein a memory 14 associated with a data processor 15 receives signals representative of information read from a plurality of punched cards 16 by a serial card reader 17. The signals pass through a card reader logic circuit 18 and a card reader controller 19 and are placed in memory 14 under the control of priority control logic 20.

Card reader 17 may be one of the known types and is illustrated schematically in FIG. 1 to show the relative positions of the various components of such a device. Cards 16 are moved over sensing or reading stations 21, 21'. Reading stations 21, 21' each may comprise, for example, 12 photocells and 12 lamps (not shown). The lamps may be mounted above the photocells which are embedded in a block and masked by a plate having only a narrow slot above each photocell. The lamps, the slots in the mask, and the centers of the photocells are vertically aligned. Reading station 21' reads the same information as reading station 21 but one column later in time.

As shown in FIG. 1, a card hopper 22 is arranged to hold a stack of cards to be read. A solenoid (not shown) is momentarily energized to selectively engage a single revolution clutch 23 for one complete revolution of operation, in response to which a feed table 24 having a picker knife edge 25 pushes the bottom card of the stack to a driven roller 26. Roller 26 transfers the card onto a sensing platform 27 against a guide rail 28. A motor 29 drives the usual gear trains, linkages and pulleys (not shown) needed for moving the various parts of the card reader structure.

When clutch 23 is actuated for a single revolution, a card is caused to be fed from hopper 22 onto the sensing platform 27. A cam (not shown) causes a feeding arm 30 to advance the card on the sensing platform to the reading stations 21, 21'. As the feed arm 30 advances the card to the reading stations, a suitable leading edge detector of a photoelectric timing generator is utilized for synchronizing the reading and transferring of information such as, for example, data from the card to the data processor. Feed arm 30 advances the card so that feed roller 31 engages the card and moves the card over the reading station.

Figures 2, 3:
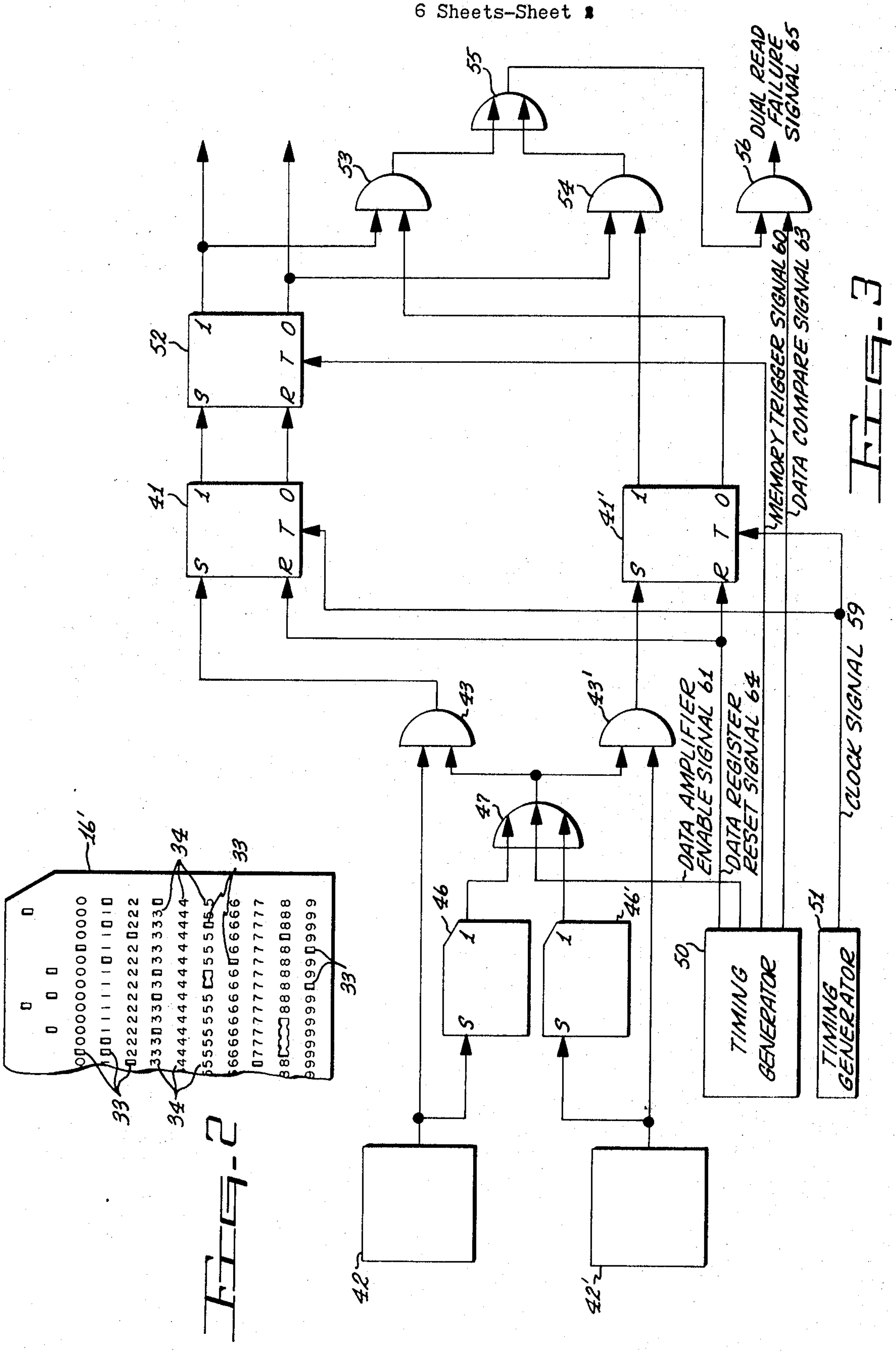
FIG. 2 is a partial view of a standard 80 column, 12 row punched card showing information punched on the card and diagrammatically illustrating torn webs between some of the punched holes.
FIG. 3 is a block diagram of the logic circuitry of the present invention.

FIG. 2 illustrates a partial view of a standard 80 column, 12 row punched card 16' showing the recorded punched information, represented by rectangular impressions, at the intersections of the various rows and columns. The punched holes or rectangular impressions 33 represent binary 1's and the blanks 34 (i.e., no punch impressions) at the intersections of the various rows and columns represent binary 0's. The 12 rows are divided into two areas, namely a zone area and a numeric area. The zone area consists of rows 0, 11 and 12 and the numeric area consists of rows 0 through 9. Row 0, shown immediately below the unnumbered rows 11 and 12, is common to both zone and numeric areas. Information in the alphanumeric format represents the 26 letters of the alphabet, the numerals 0 through 9, and 28 special characters, punctuation marks and blank spaces. Numerals are represented by a single punch per column in rows 0 through 9. Alphabetics are represented by two punches per column, a zero punch and a numeric punch. Special characters consist of either 2 or 3 punches per column. Since each column of the card shown in FIG. 2 contains a single character, each card can hold 80 characters.

FIG. 3 illustrates in block diagram the logic circuitry provided for implementing the features of the present invention. Although a card reader may have 12 identical sensing station arrangements, one for each card row, for reading the cards sequentially column by column, only one row sensing station arrangement is shown in FIG. 3 for purposes of simplicity. Similarly, the logic circuitry disclosed in FIG. 3 is provided for only one row sensing station arrangement and similar circuitry must be employed for any other row sensing station used.

The reading or sensing stations 21, 21', shown in FIG. 1, are provided for reading the information punched in a given row of card 16' as it is moved column by column past the sensing stations. Signals representative of the information read by stations 21, 21' are transferred to and stored in a suitable buffering means such as flip-flops 41, 41'. As used herein, buffering is intended to mean the ability of a facility such as a storage register or flip-flop to provide temporary storage of the binary digit (bit) being read by the card reader before transferring it, for example, to the data processor. The flip-flop or bistable multivibrator described herein is a circuit adapted to operate in either one of two stable states and to transfer from the state in which it is operating to the other stable state upon application of a trigger signal thereto. In one state of operation, the flip-flop represents the binary 1 (1-state) and in the other state, the binary 0 (0-state).

The two leads entering the left-hand side of the flip-flop symbols shown in FIG. 3 and labeled S and R provide the input signals. The upper input lead, the set input lead S, provides the set signal and the lower input lead, the reset input lead R, provides the reset input signal. When the set input signal goes positive, the flip-flop is enabled and will be transferred to its 1-state upon the simultaneous application of a timing or trigger pulse to its input terminal T, if it is not already in the 1-state. When the reset input signal goes positive, the flip-flop is enabled and will be transferred to its 0-state upon the simultaneous application of a timing or trigger pulse to its input terminal T, if it is not already in the 0-state. The two leads leaving the right-hand side of the flip-flop symbols deliver the two output signals. The upper output lead, the 1 output lead, delivers the 1 output signal of the flip-flop and the lower output lead, the 0 output lead, delivers the 0 output signal. Positive signals transferred to flip-flops 41, 41' set the flip-flops to their 1-states upon the next occurrence of a timing pulse at its input terminal.

Information read by the read stations 21, 21' is transferred to flip-flops 41, 41' through amplifiers 42, 42' and AND gates 43, 43'. Read station 21 reads a given row of card 16' first and read station 21' reads the same information in the same row a predetermined time later, namely one card column later than read station 21.

The AND gates disclosed in FIG. 3 provide the logical operation of conjunction for binary 1 signals applied thereto. In the system disclosed, a binary 1 is represented by a positive signal, the AND gate provides a positive output signal representing a binary 1 when, and only when, all of the input signals applied thereto are positive and represent binary 1's.

The amplified output signals of amplifiers 42, 42' are also transferred through monostable multivibrators or flip-flops 46, 46' and OR gate 47 to one input terminal of each of AND gates 43, 43' as shown in FIG. 3.

Monostable multivibrators 46, 46' are circuits similar to the flip-flop circuits of the bistable multivibrator or flip-flops 41, 41' differing only in that they operate in one stable state rather than two. They transfer from their reset states in which they are normally operating to their set states upon application of a trigger signal thereto. In its set state, the monostable multivibrator represents the binary 1 (1-state) and in the reset state, the binary 0 (0-state). The lead entering the left-hand side of the monostable multivibrator symbols shown in FIG. 3 provide the set input signal. When the set input signal goes positive, the monostable multivibrator is transferred to its 1-state. It will stay in this set state for a predetermined period of time depending on the time delay rating of the multivibrator and will then automatically return to its stable state (i.e., its reset state). Because the monostable multivibrator returns by itself to its reset state, no reset input is required. The period of time the multivibrator remains in its set state can be controlled by the selection of electronic components used to build the monostable multivibrator circuit. In the circuit disclosed, the duration of the 1 output signal of multivibrator 46 is approximately equal to 2 microseconds.

As shown in FIG. 3, the 1 output terminals of the monostable multivibrators 46, 46' are connected to two different input terminals of OR gate 47. OR gate 47 provides the logical operation of inclusive OR for binary 1 input signals applied thereto and provides an output signal representing a binary 1 when any one or more of the input signals applied thereto represents binary 1's. As shown in FIG. 3, OR gate 47 has three input terminals, one of which is connected to the output terminal of each of the monostable multivibrators 46, 46'. The third input terminal is connected to a timing generator 50 having a number of different pulse signals, as shown in FIG. 3.

A timing generator 51 provides a sequence of synchronizing clock pulses of approximately 2 millionth of a second duration. These pulses, as shown in FIG. 3, are transmitted to the triggering terminals T of flip-flops 41, 41'.

The output terminals 1 and 0 of flip-flop 41 are directly connected to the set and reset input terminals of a flip-flop 52. The output terminals 1 and 0 of flip-flop 52 are connected to the priority control logic circuits 20, shown in FIG. 1, as well as to the input terminals of AND gates 53 and 54, respectively. The 1 and 0 output terminals of flip-flop 41' are connected to another input terminal of AND gates 54 and 53, respectively. The output terminals of AND gates 53 and 54 are each connected to a different input terminal of OR gate 55. The output terminal of OR gate 55 is connected to an input terminal of AND gate 56. The other input terminal of AND gate 56 is connected to the timing generator 50.

In accordance with the invention claimed, amplifiers 42 and 42' are at positive potentials or their true state when reading a punched hole or when no card is at the read stations 21, 21'. Since monostable multivibrators 46, 46' are normally in their reset stable states, their output terminals are normally at a more negative or binary 0 condition.

Whenever a dark-to-light transition takes place, for example, during the reading of a punched hole in card 16', the respective monostable multivibrators 46 and 46' involved is set or triggered to its unstable set state for a 2-microsecond period of time. The setting of either monostable multivibrator causes conjunction to occur in OR gate 47 and a positive output signal representing a binary 1 is applied as enabling signals to an input terminal of each of AND gates 43 and 43'. Since the other input terminals of AND gates 43, 43' are positive when the monostable multivibrators are set, the information representative of the punched hole read is transferred through AND gates 43, 43' to set flip-flops 41, 41' upon the receipt of a timing pulse from timing generator 51. It should be remembered that amplifier 42' is energized by read station 21' which reads the same information as read station 21 but delayed by the period of time necessary to pass the card column from read station 21 to read station 21'.

The output signal of the 1 terminal of flip-flop 41 is transmitted to and sets flip-flop 52 upon the occurrence of a timing pulse from timing generator 50.

Figure 4:
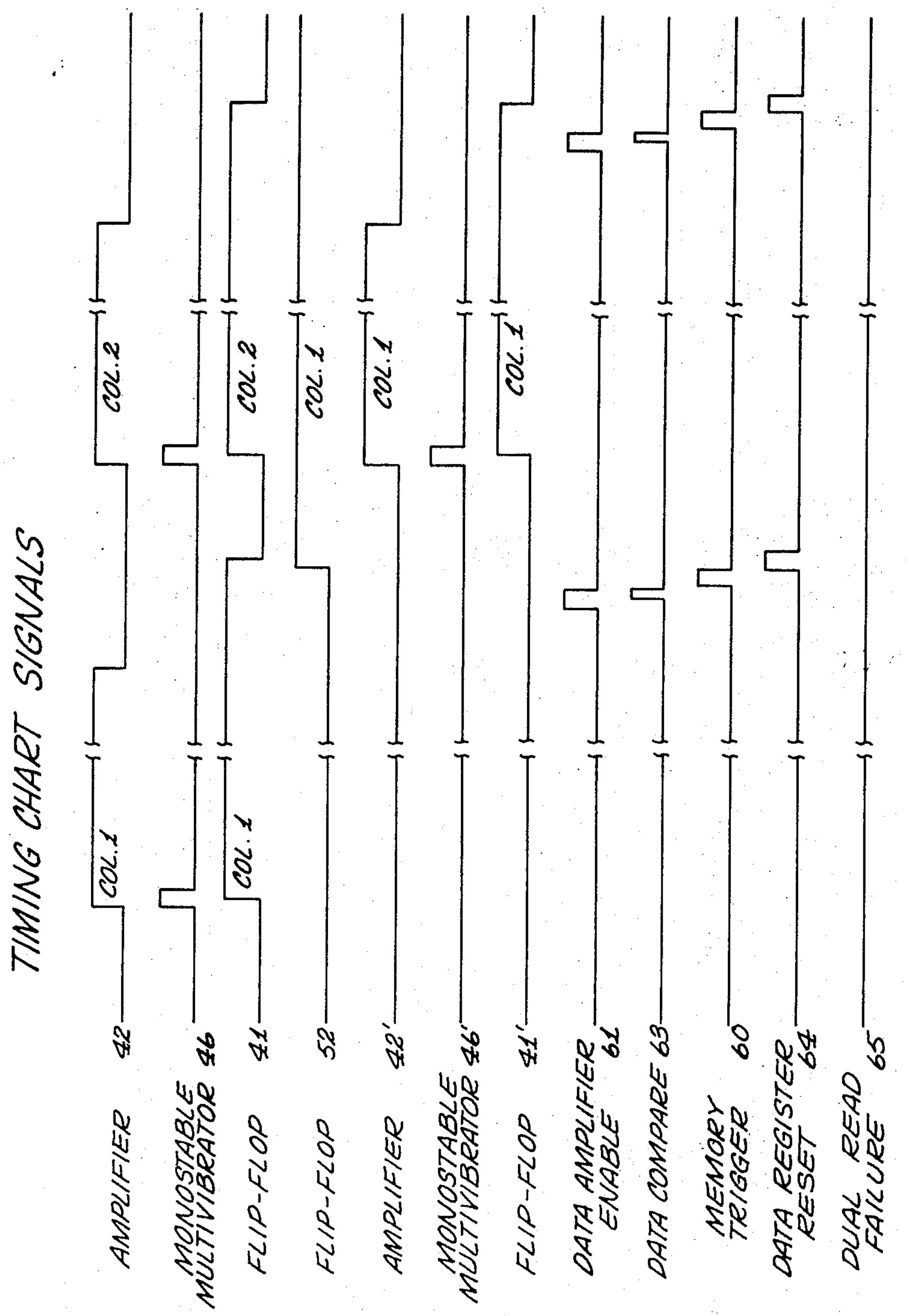
FIG. 4 is a timing chart of the timing sequence and the relationship between the signals occurring in the information processing system disclosed.

FIG. 4 illustrates a typical timing sequence and relationship between the various signals of the data processing system disclosed. As card 16' passes through the reading station 21, the following sequence takes place for any given row being read. Amplifier 42 senses a punched hole and indicates this light condition by being rendered positive. The positive condition of the output terminal of amplifier 42 sets the monostable multivibrator 46 as well as applies a positive signal to the upper input terminal of AND gate 43. In its set state, the monostable multivibrator 46 represents the binary 1 (1-state) and this signal is transmitted through OR gate 47 to enable AND gate 43. Conjunction then occurs in AND gate 43 and a positive output signal from AND gate 43 is applied to flip-flop 41 which sets upon receipt of the next timing pulse 59 from timing generator 51.

As the web from the punched hole in the row being read of card 16' passes the reading station 21, amplifier 42 is rendered negative. During the sensing of the web by the reading station 21, the flip-flop 41 remains set, providing the data extension necessary until the data memory triggering signal 60 is received from the timing generator 50 for setting memory flip-flop 52.

During the reading of the web, a data amplifier enable signal 61 is generated by the timing generator 50 which is transmitted through OR gate 47 to AND gates 43 and 43'. Since amplifiers 42 and 42' are negative at this time, conjunction does not occur in AND gates 43 and 43' and the flip-flops 41 and 41' are not again enabled.

A data register reset signal 64 is then generated by the timing generator 51 for resetting flip-flop 41 completing the cycle for reading that column of the card by reading station 21.

As the card moves to the next column to be read and a punched hole is again read, amplifier 42 is again rendered positive and the monostable multivibrator 46 is set resulting in the transferring of a binary 1 signal through AND gate 43 to again set flip-flop 41. The timing diagram shown in FIG. 4 illustrates this condition.

During the time that reading station 21 is reading column 2 of the punched card, reading station 21' is reading column 1 of the same row of the card. Since a punched hole appeared in column 1, amplifier 42' will be rendered positive, thereby setting monostable multivibrator 46', enabling AND gate 43' and setting flip-flop 41' upon the receipt of the next clock signal 59. This operation occurs in the same manner as discussed above for the reading of column 1 by the sensing station 21. The output signals of flip-flop 41' enable AND gates 53 and 54; however, since flip-flop 52 was set and at this time is still set, conjunction will not occur in AND gates 53 and 54. Flip-flop 52 has stored for one column time the fact that reading station 21 sensed a punched hole in column 1 so as to provide time to compare its storage condition with the information read by reading station 21'. Since the output terminal signal of AND gates 53 and 54 is a binary 0, conjunction will not occur in AND gate 56 and an error condition will not be indicated as a dual read failure signal 65 by this device.

If sensing station 21' did not read a punched hole, indicating an error condition, flip-flop 41' would not have been set and AND gate 53 and OR gate 55 would then have been enabled by the positive output signal from the 0 output terminal of flip-flop 41'. Conjunction would then occur in AND gate 53, thereby enabling OR gate 55 and AND gate 56 and, upon the occurrence of the next data compare signal 63 from the timing generator 50, would cause conjunction to occur in AND gate 56 indicating an error condition by a positive output dual read failure signal 65.

Figure 5:
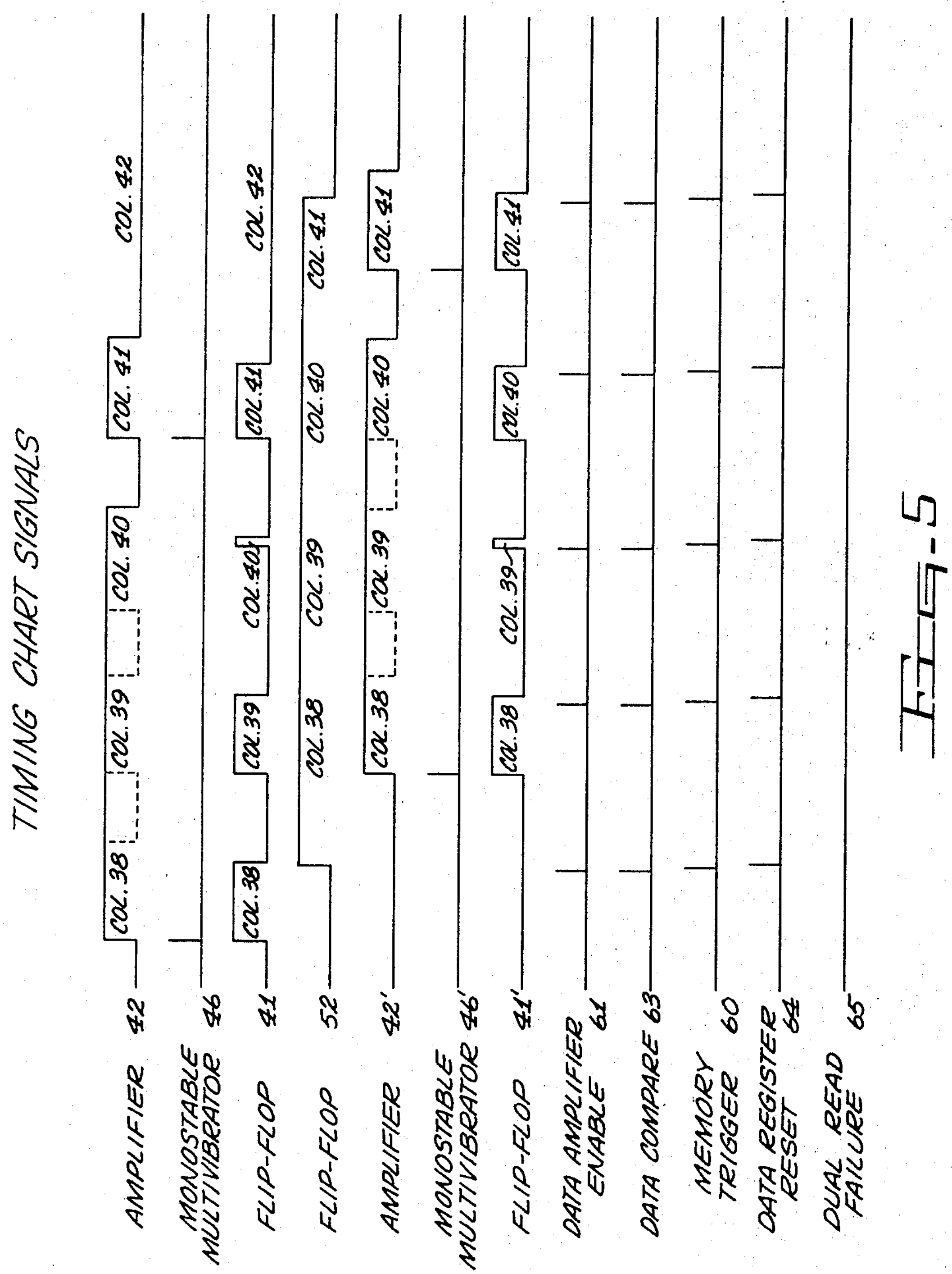
FIG. 5 is a typical timing sequence and the relationship between signals through the information processing system when cards with missing webs are being read and the data corrections that occur.

FIG. 5 illustrates a typical timing sequence and the relationship between signals through the data processing system when cards with missing or damaged webs are being read and also illustrating the data correction that occurs.

The operation of the data-processing system shown in FIG. 5 is similar to that disclosed above and illustrated by the timing chart shown in FIG. 4 with the differences discussed below. As shown in FIG. 5, the punched card 16' may be read in an area where a number of webs have been torn or missing. In such a case, amplifier 42 associated with the reading station 21 will be rendered positive upon reading a punched hole such as a hole in column 38. As illustrated in FIG. 5, the webs between columns 38 and 39 and between columns 39 and 40 are missing. Thus, amplifier 42 will remain positive from the time column 38 is read until the web between columns 40 and 41 is sensed. Similarly, the monostable multivibrator 46 associated with amplifier 42 will be triggered only once as a result of amplifier 42 going positive upon the reading of the punched hole in column 38. The second curve from the top of the timing chart in FIG. 5 illustrates this point. As a result of the reading of the punched hole in column 38 by the reading station 21, flip-flop 41 is set as heretofore described. Reading station 21' also reads column 38 and, as described, sets flip-flop 41'. The enabling signal resulting from the setting of the monostable multivibrator 46' for AND gate 43' causing the setting of flip-flop 41' also enables AND gate 43. Since amplifier 42 has remained positive during station *21's* reading of column 39, because of the torn web between columns 38 and 39, AND gate 43 will be enabled by the signal from monostable multivibrator 46' and flip-flop 41 will be set. Thus, even though a torn web condition has occurred, the circuitry has corrected for this error condition and AND gate 56 will not indicate an error.

During the period of time that column 40 is being read by reading station 21 and column 39 is being read by reading station 21', the monostable multivibrators 46 and 46' will not be triggered since amplifiers 42 and 42' have remained positive because of a torn web condition and these devices are triggered only on a rising pulse condition of the amplifiers 42 and 42'. This dual error condition is rectified by data amplifier enable signal 61 provided by timing generator 50. This signal periodically occurs, as shown in FIG. 5, and is transmitted by the timing generator 50 through OR gate 47 to input terminals of AND gates 43, 43'. These AND gates are then enabled resulting in the setting of flip-flops 41 and 41'. Thus, the dual error condition described has been compensated for.

Figure 6:
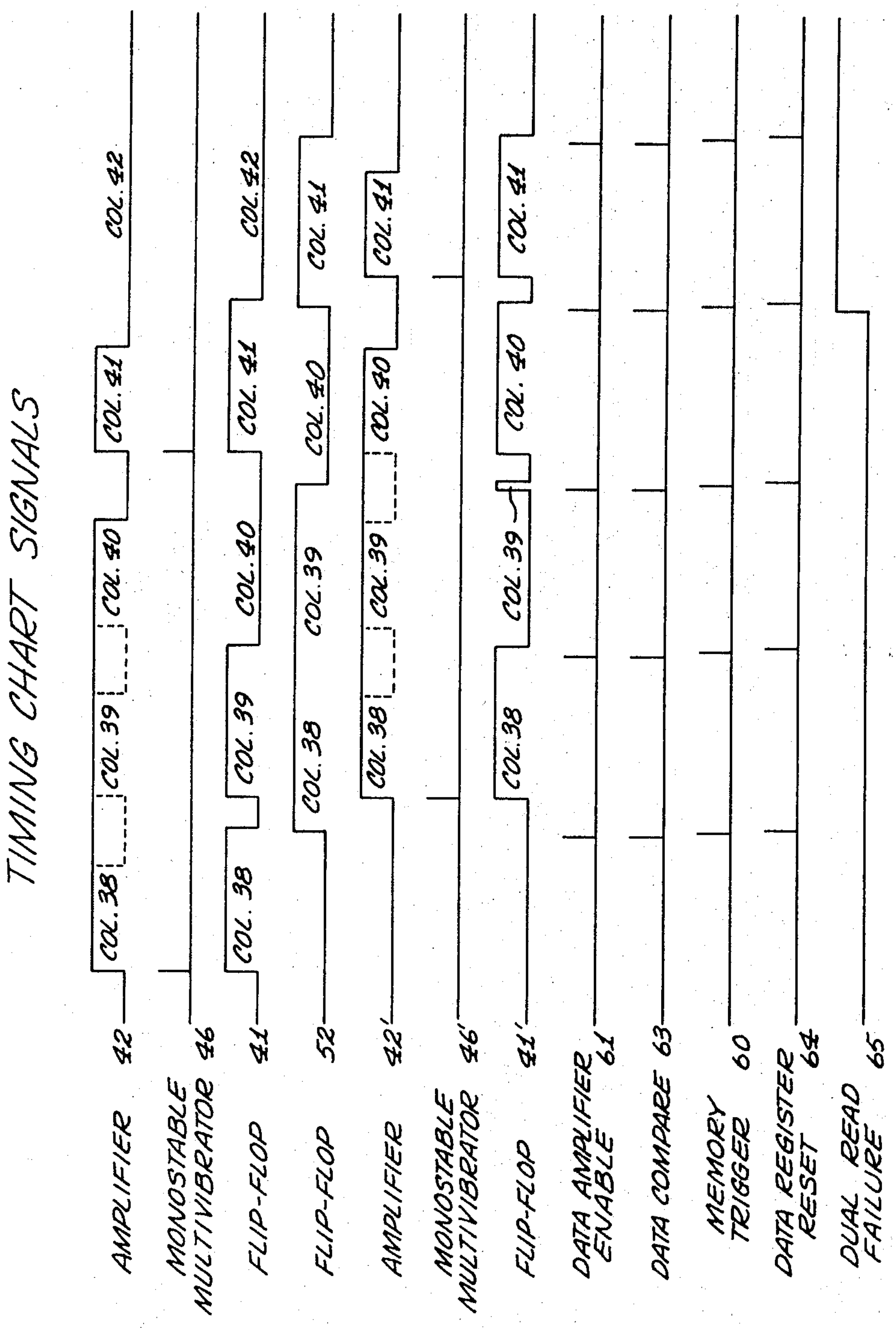
FIG. 6 is a timing chart similar to that shown in FIG. 5 with the synchronizing pulses occurring during the web sensing time.

FIG. 6 illustrates generally the same timing chart as the one shown in FIG. 5 with the exception that the timing generating pulses in curves 8 through 11 from the top of the timing chart occur during the web-sensing time. In this instance, due to the torn web condition shown, the monostable multivibrators 46, 46′ are not triggered during the reading of column 40 because the data amplifier enable signal occurs during the web time of the reading station 21. At this time, amplifier 42 is at a negative potential and monostable multivibrator 46 is not triggered. Flip-flop 52 is reset by the memory trigger signal 60. At the time that reading station 21′ is sensing column 40, flip-flop 41′ is set. This occurs because at this time reading station 21 is sensing the punched hole in column 41 which causes a triggering of its monostable multivibrator 46. The binary 1 output of monostable multivibrator 46 is transferred through OR gate 47 to enable AND gate 43′ causing conjunction to occur in AND gate 43′ and the setting of flip-flop 41′ at the next clock signal 59 from timing generator 51. Since flip-flop 52 is reset, upon the setting of flip-flop 41′, conjunction occurs in AND gate 54 resulting in the enabling of OR gate 55 and of AND gate 56. At the next data compare signal 63, conjunction occurs in AND gate 56 and the dual read failure is indicated by the binary 1 output signal 65 of AND gate 56. This indicates that when the error condition cannot be corrected, the error was detected as a dual read-type failure.

Figure 7:
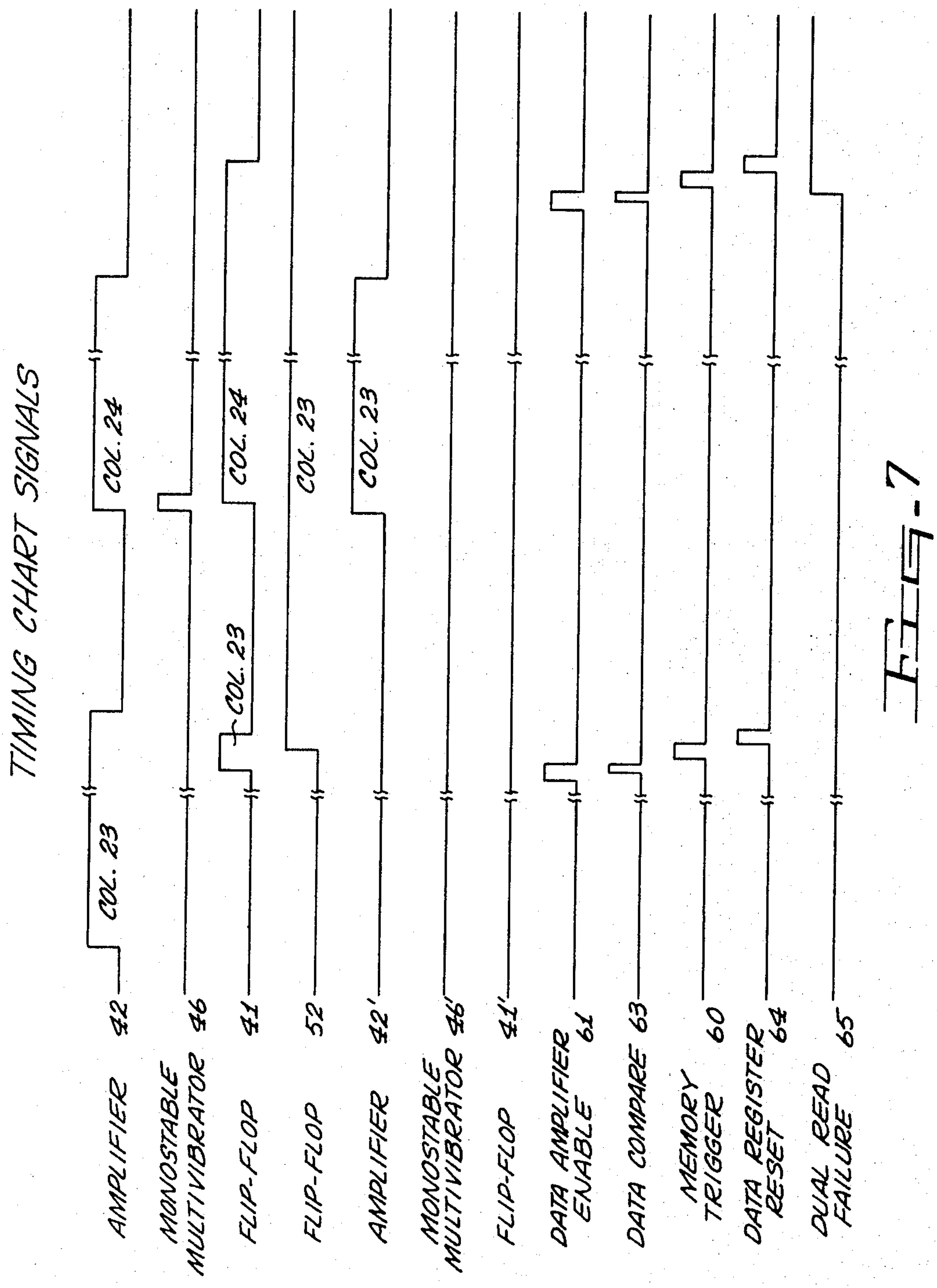
FIG. 7 is a timing chart illustrating a circuit failure with error corrected and a circuit failure with error detected.

FIG. 7 illustrates the timing chart of a first situation where a circuit failure occurred and was corrected and a second situation where a circuit failure occurred but was not corrected but detected as a dual read failure.

In the first situation, the monostable multivibrator 46 failed to set during the reading of the punched hole in column 23 even though amplifier 42 was rendered positive. This failure could be due to a malfunctioning of the multivibrator internal circuitry. This error is corrected when the data amplifier enable signal occurs, as heretofore explained, during the time that amplifier 42 is positive.

In the second situation, the monostable multivibrator 46′ failed to trigger during the reading of the punched hole in column 23 by the reading station 21′ upon amplifier 42′ being rendered positive. In this instance, the data amplifier enable signal 61 occurs after amplifier 42′ is rendered negative. Consequently, flip-flop 41′ is not set. Thus, when the data compare signal is generated, flip-flop 52 will have been set by the corrected error condition of situation one but flip-flop 41′ will not have been set. Such a situation causes conjunction to occur in AND gate 56 and an error signal to be generated.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

We claim:

1. In a system for reading a medium having coded information punched therein and detecting and correcting errors thereof, the combination comprising:

a first and a second reading means for producing a first type of signal when said reading means senses a hole in the medium and a second type of signal when said reading means senses an absence of a hole;

a signal timing means coupled to said first and second reading means for producing a third signal for a predetermined time upon receiving said first type of signal;

a first signal controlling means coupled to said signal timing means and to said first reading means for generating a fourth signal upon the concurrence of said first signal and said third signal;

a second signal controlling means coupled to said signal timing means and to said second reading means for generating a fifth signal upon the concurrence of said first signal and said third signal;

bistable means coupled to said first signal controlling means for producing a set and reset signal representative of said fourth signal; and means for comparing the state of said bistable means and said fifth signal for detecting and correcting errors in the reading of coded information punched in said medium.

2. A system as described in claim 1 wherein said means coupled to said signal controlling means for periodically providing a fourth signal comprises a timing generator for generating said fourth signal.

3. A system as described in claim 1 wherein said signal timing means comprises a monostable multivibrator.

4. In a system for reading a medium having coded information punched therein and employing reading means for sequentially twice sensing the presence and absence of holes in said medium and for delivering a first type of signal when said sensing means reads a hole and a second type of signal when said sensing means reads the absence of a hole, the combination comprising: a pair of storage means each coupled to receive said first type of signal for assuming a first state, one of said storage means receiving signals representative of the information first sensed by said reading means and the other of said storage means sequentially receiving signals representative of the information sensed the second time by said reading means, a pair of signal timing means, a first one of said timing means being coupled to receive the signals representative of the information first sensed by said reading means and the second one of said timing means being coupled to receive the signals representative of the information sensed by the second reading of said information, each of said timing means upon receipt of said first type of signal delivering a third signal for a predetermined time, and a pair of signal controlling means, one of said signal controlling means being coupled to receive said first type of signal from said reading means representative of the first reading of said information and the other of said signal controlling means being coupled to receive said first type of signal representative of the second reading of said information, said one of said signal controlling means upon the concurrence of said first type of signal from said reading means and said third signal from either of said timing means causing said one of said storage means to assume said first state.

5. A system as described in claim 4 wherein each of said signal timing means comprises a monostable multivibrator.

6. In a system for reading a medium having coded information punched therein and employing reading means for sequentially twice sensing the presence and absence of holes in said medium and for delivering a first type of signal when said reading means senses a hole and a second type of signal when said reading means senses the absence of a hole, the combination comprising: a pair of storage means each coupled to receive said first type of signal for assuming a first state, one of said storage means receiving signals representative of the information first sensed by said reading means and the other of said storage means sequentially receiving signals representative of the information sensed the second time by said reading means, pair of signal timing means, a first one of said timing means being coupled to receive the signals representative of the information first sensed by said reading means and the second one of said timing means being coupled to receive the signals representative of the information sensed by the second reading of said information, each of said timing means upon receipt of said first type of signal delivering a third signal for a predetermined time, and a pair of signal controlling means, one of said signal controlling means being coupled to receive said first type of signal from said reading means representative of the first reading of said information and the other of said signal controlling means being coupled to receive said first type of signal representative of the second reading of said information, each of said signal controlling means upon the receipt and concurrence of said first type of signal from said reading means and said third signal from either of said timing means causing a different one of said storage means to assume said first state.

7. A system as described in claim 6 wherein each of said signal timing means comprises a monostable multivibrator.

8. A system as described in claim 6, in further combination with error detection means coupled to said pair of storage means for indicating the storage status of the dual reading of the information.

9. In a system for reading a medium having coded information punched therein and employing reading means for sequentially twice sensing the presence and absence of holes in said medium and for delivering a first type of signal when said reading means senses a hole and a second type of signal when said reading means senses the absence of a hole, the combination comprising: a pair of storage means each coupled to receive said first type of signal for assuming a first state, one of said storage means receiving signals representative of the information first sensed by said reading means and the other of said storage means sequentially receiving signals representative of the information sensed the second time by said reading means, a pair of signal timing means, a first one of said timing means being coupled to receive the signals representative of the information first sensed by said reading means and the second one of said timing means being coupled to receive the signals representative of the information sensed by the second reading of said information, each of said timing means upon receipt of said first type of signal delivering a third signal for a predetermined time, a pair of signal controlling means, one of said signal controlling means being coupled to receive said first type of signal from said reading means representative of the first reading of said information and the other of said signal controlling means being coupled to receive said first type of signal representative of the second reading of said information, each of said signal controlling means upon the receipt and concurrence of said first type of signal from said reading means and said third signal from either of said timing means causing a different one of said storage means to assume said first state, a third storage means coupled to said first storage means for periodically assuming the storage condition of said first storage means, and error detection means coupled to said second and third storage means for producing an error signal when the storage conditions of said second and third storage means are different.